United States Patent
Malanga et al.

(10) Patent No.: US 9,481,605 B2
(45) Date of Patent: Nov. 1, 2016

(54) POROUS MULLITE BODIES HAVING IMPROVED THERMAL STABILITY

(71) Applicant: Dow Global Technologies LLC, Midland, MI (US)

(72) Inventors: Michael T. Malanga, Midland, MI (US); James J. O'Brien, Midland, MI (US); Aleksander J. Pyzik, Midland, MI (US); Nicholas M. Shinkel, Linwood, MI (US); Clifford S. Todd, Midland, MI (US); Paul C. Vosejpka, Midland, MI (US); Robin P. Ziebarth, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/437,578

(22) PCT Filed: Mar. 7, 2013

(86) PCT No.: PCT/US2013/029591
§ 371 (c)(1),
(2) Date: Apr. 22, 2015

(87) PCT Pub. No.: WO2014/088619
PCT Pub. Date: Jun. 12, 2014

(65) Prior Publication Data
US 2015/0284294 A1    Oct. 8, 2015

Related U.S. Application Data

(60) Provisional application No. 61/733,549, filed on Dec. 5, 2012.

(51) Int. Cl.
C04B 35/00     (2006.01)
C04B 35/185    (2006.01)
C04B 35/565    (2006.01)
C04B 35/584    (2006.01)
C04B 35/64     (2006.01)
F01N 3/021     (2006.01)

(52) U.S. Cl.
CPC .......... *C04B 35/185* (2013.01); *C04B 35/565* (2013.01); *C04B 35/584* (2013.01); *C04B 35/64* (2013.01); *F01N 3/021* (2013.01); *C04B 2235/322* (2013.01); *C04B 2235/3224* (2013.01); *C04B 2235/3229* (2013.01); *C04B 2235/3272* (2013.01); *C04B 2235/46* (2013.01); *C04B 2235/6565* (2013.01); *C04B 2235/661* (2013.01); *C04B 2235/72* (2013.01); *C04B 2235/85* (2013.01); *C04B 2235/96* (2013.01)

(58) Field of Classification Search
CPC .. C04B 35/565; C04B 35/584; C04B 35/185
USPC .......................................... 501/88, 97.1, 128
See application file for complete search history.

(56) References Cited

U.S. PATENT DOCUMENTS

| 6,238,618 B1 * | 5/2001 | Brundage ............ C04B 35/185 264/638 |
| 7,485,594 B2 * | 2/2009 | Saha .................. B01D 39/2093 264/629 |
| 2015/0299045 A1 | 10/2015 | Malanga et al. |

OTHER PUBLICATIONS

International Search Report dated Jun. 6, 2013 for Application No. PCT/US2013/029591.
Office Action, for copending U.S. Appl. No. 14/437,580 dated Nov. 27, 2015.
Copending Patent Application, U.S. Appl. No. 14/437,580, filed Apr. 22, 2015, published as 2015/0299045.

* cited by examiner

*Primary Examiner* — Noah Wiese
(74) *Attorney, Agent, or Firm* — The Dobrusin Law Firm, P.C.

(57) ABSTRACT

A porous ceramic composition having improved thermal stability is comprised of ceramic grains bonded together by a grain boundary phase comprised of silica, rare earth element that is Eu, Gd, Nd or mixture thereof and oxygen and optionally yttrium, wherein the grain boundary phase has a amount of an alkali, an alkaline earth metal and a transition metal other than yttrium that is at most 2% by weight of the grain boundary phase.

20 Claims, No Drawings

POROUS MULLITE BODIES HAVING IMPROVED THERMAL STABILITY

FIELD OF THE INVENTION

The invention relates to mullite bodies and methods of forming mullite bodies. In particular, the invention relates to mullite bodies having fused interlocked acicular grains displaying improved thermal stability under particular elevated temperature environments.

BACKGROUND OF THE INVENTION

Recently, more stringent regulations of particulate matter emitted by diesel engines have been passed in Europe and the United States. To meet these regulations, it is expected that particulate filters will be necessary.

These particulate filters need to meet multiple contradictory exacting requirements. For example, the filter must have sufficient porosity (generally greater than 55 percent porosity) while still retaining most of the emitted micrometer sized diesel particulates (generally greater than 90 percent capture of the emitted particulates). The filter must also be permeable enough so that back pressure is relatively low while the filter is in the clean state and also remains low while accumulating an amount of soot before being regenerated.

The filter must withstand the corrosive exhaust environment for long periods of time. The filter must have an initial strength to be compression fitted into a container attached to the exhaust system. The filter must be able to withstand thermal cycling (i.e., retain adequate strength) from the burning off of the soot entrapped in the filter (regeneration) over thousands of cycles where local temperatures may reach as high as 1600° C. and typically reach between 600 to 1000° C. under typical regeneration cycles.

The filter must, for long periods of time, withstand the corrosive exhaust environment containing water, nitrous oxide, carbon monoxide, carbon dioxide and hydrocarbons at elevated temperature. In addition, the filter must be stable to not only gaseous environment, but materials that are in contact with the filter such as catalyst and catalyst supports (washcoat particulates such as high surface area alumina) and ash from the exhaust such as alkali and alkaline earth oxides and other metal oxides, phosphates, and sulfates.

Porous ceramic filters generally are made from extrusions of ceramic particulates that when heated bond together to form a porous ceramic body made up of many individual ceramic grains ceramically bonded together via a disordered/glassy grain boundary phase, or ordered/crystalline grain boundary phase, or a combination thereof of differing composition than the individual ceramic grains. For example, cordierite in many instances has a glassy grain boundary phase. Mullite filters as well often have such glassy grain boundary phases such as those having interlaced crystals grown together have been used and are described by U.S. Pat. Nos. 5,098,455; 6,596,665; 7,528,087; and 7,425,297; and WO 92/11219. Silicon carbide, likewise often has a glassy grain boundary phase or silicon binding phase depending on the process used to sinter the grains together.

Accordingly, it would be desirable to provide both a formation method and a ceramic composition that meets or improves one or more of the aforementioned and in particular improves the thermal stability of such a composition.

SUMMARY OF THE INVENTION

We have discovered that certain washcoat particulates such as those containing alumina or ash may cause weakening of the grain boundary phase of ceramic filters over long periods of time when exposed to elevated temperatures and atmospheres encountered in internal combustion exhaust streams (e.g., gasoline and diesel engines). We have now discovered a porous ceramic filter that solves this previously unknown problem.

A first aspect of the present invention is a porous ceramic composition comprising ceramic grains bonded together by a grain boundary phase comprised of silica, rare earth element that is Eu, Gd, Nd or mixture thereof and oxygen and optionally yttrium, wherein the grain boundary phase has a amount of an alkali, an alkaline earth metal and a transition metal other than yttrium that is at most 2% by weight of the grain boundary phase.

The operating conditions experienced by engine particulate filters are complex due to varying environments, temperature and exposure to catalysts used to treat the exhaust and ever larger amounts of ash over time, it is not understood why the present composition realizes improved thermomechanical stability over time. It is believed, however, but in no way limiting the invention, that the rare earth metals somehow protectively lock up the glassy grain boundary phase when initially formed and protect it from attack (e.g., etching, phase separation, cracking and the like) from other particulates that come in contact with grains such as alumina wash coat particulates or ash particulates. Ash particulates (e.g., metal oxides phosphates and the like) are residue of the soot after the soot (e.g., carbonaceous matter) has been removed (e.g., oxidized) during regeneration of the filter.

A second aspect of the invention is a porous ceramic composition comprised of ceramic grains bonded together by a grain boundary phase comprised of silicon, rare earth that is Eu, Gd, Nd or mixture thereof, and oxygen wherein the porous ceramic filter retains greater than 80% of its strength after being heated to 860° C. and held for 100 hours under an atmosphere of humid air having at least 10% by volume of water wherein at least a portion of the grain boundary phase is in contact with gamma alumina particulates.

A third aspect of the invention is a method for preparing a porous ceramic composition, the method comprising, a) forming a mixture of one or more precursor compounds having a rare earth element that is Eu, Gd, Nd or mixture thereof and elements present in the ceramic composition, b) shaping the mixture into a porous green shape, c) heating the porous green shape of step (b) to a temperature such that ceramic grains arising from the ceramic particulates are bonded together by a ceramic grain boundary phase containing the rare earth element and oxygen.

Surprisingly, the presence of these particular rare earth elements in the grain boundary phase in combination with the absence of any substantial amount of other metals described above results in a porous acicular mullite structure that has a thermal shock factor and strength that is retained compared to a ceramic composition made without such rare earth metals.

The porous ceramic composition of the present invention may be used in any application taking advantage of a porous ceramic. Examples include filters, refractories, thermal and electrical insulators, reinforcement for composite bodies of metals or plastics, catalysts and catalyst supports.

DETAILED DESCRIPTION OF THE INVENTION

Ceramic Composition

The porous ceramic composition is comprised of ceramic grains. The ceramic grains may be any useful ceramic that does not contain an alkali metal, alkaline earth metal or other transition metal excluding yttrium. Exemplary ceramics include alumino silicates (e.g., mullite), carbides, nitrides, carbonitrides, silicates, and aluminates. The ceramic grains desirably are mullite, silicon carbide or silicon nitride.

The porous ceramic composition may have any porosity that is suitable for the applications described above. Typically, the composition is 40% to 85% porous. Generally, the porosity is at least 45%, 50%, 60%, 65% to at most about 85% or 80%.

The ceramic grains also desirably have an aspect ratio of greater than about 2 (e.g., length twice as great as width), which are referred to herein as "acicular" grains. Desirably, the acicular grains are mullite or silicon carbide and in particular mullite. Further the ceramic grains may have an average aspect ratio of at least about 2. Preferably, the average aspect ratio is at least about 5 to preferably at most about 50.

The microstructure may be determined by suitable techniques such as microscopy on a polished section. For example, the average grain size may be determined from a scanning electron micrograph (SEM) of a polished section of the body, wherein the average grain size may be determined by the intercept method described by Underwood in *Quantitative Stereology*, Addison Wesley, Reading, Mass., (1970).

The ceramic grains are bonded together via a grain boundary phase. The grain boundary phase is comprised of a Eu, Gd, Nd or mixture thereof and oxygen. The grain boundary phase may contain other elements or mixtures thereof, examples being yttrium, group 13 elements (e.g., B, Al or Ga), group 14 elements (e.g., Si, C or Ge) and group 15 elements (e.g. N or F). In particular embodiments, the elements present may include Si, Al, and Y.

If the grain boundary contains yttrium, the amount of the yttrium is typically less than 25% by mole of the grain boundary phase and desirably is less than 20%, 15%, 10%, 5% or 0% by mole of the glassy grain boundary phase.

The grain boundary phase may be amorphous (i.e., disordered phase) or crystalline and is comprised of oxygen and Eu, Gd, Nd or mixture thereof and optionally the aforementioned other elements. Amorphous means that there is no molecular or atomic structure that is detectable using typical analytical techniques. That is, there may be some very small ordered structure, but due to the size of such order, the techniques to measure such order, for example, fail to detect or is not substantially different than an amorphous material. For example, the ordered domains may be of such a small size that X-ray diffraction or electron diffraction results in such diffuse scattering that if such domains were present they would be of a size of at most about 50 nanometers.

In a preferred embodiment, the amorphous grain boundary phase is of a uniform chemical composition. Uniform in this context means that there is not two or more distinct phase separated glass regions within a majority of the amorphous grain boundary regions lying between grain intersections ("fillets"). Preferably, at least 75%, 80%, 85%, 90%, 95%, 99% or even essentially all of the fillets have a uniform amorphous phase. When determining the uniformity, an appropriate statistical amount of randomly selected fillets (e.g., 25 to 100) within a body are selected and examined via back scattered scanning electron microscopy to determine whether the fillet is homogeneous or separated into two or more glass regions having different chemical composition. Different chemical composition is when one of the rare earth elements Eu, Gd, Nd present in the glass varies across the fillet by more than 10% when analyzed across the fillet.

The amorphous grain boundary phase should also be free, as much as possible, of alkali metals, alkaline earth metals and transition metals other than yttrium. The total amount of these should be at most 2% by weight of the grain boundary phase. Generally, the total amount of these metals is at most 1.5%, 1%, 0.75%, 0.5%, 0.1%, 0.01% or below the detection limit of analytical techniques useful for measuring elemental composition (i.e., essentially zero) of grain boundary phase such as those known in the electron microscopy art for determining chemical composition including, for example, energy dispersive spectrometry (EDS).

Particularly deleterious metals include iron and magnesium. Even though the total amount of metal described above, it is desirable that Mg and Fe are at most 0.1% by weight of the grain boundary phase.

Generally, the amount of the grain boundary phase is at least 1% to less than 15% by volume of the porous ceramic composition.

It has been observed that a ceramic composition having a grain boundary phase of Eu, Gd, Nd or mixture thereof, Si and O that is free from the particular metals as described above forms a composition and in particular a porous acicular mullite composition that has improved strength retention after being exposed to ash and/or catalyst wash coats comprised of alumina at elevated temperatures in atmospheres containing water such as those encountered in an internal combustion engines exhaust.

In a particular embodiment, the porous ceramic composition retains greater than 80% of its strength after being heated to 860° C. and held for 100 hours under an atmosphere of humid air, wherein at least a portion of the grain boundary phase is in contact with gamma alumina particulates and the amount of water is at 10 volume %. The amount of gamma alumina that is present on the porous ceramic composition is an amount sufficient to be in contact with at least 5% of the surface area of the porous ceramic composition. The gamma alumina may be deposited by any suitable means such as painting, dip coated, insipient wetness techniques, positive and negative pressure powder coating means, aerosolization, or other known techniques for depositing catalysts on porous ceramic substrates.

Generally, the ceramic, when used as internal combustion particulate trap should have a strength (herein modulus of rupture "MOR" as measured using a 4 point bend measurement) that is adequate to survive in such an environment. Generally, the MOR is at least about 5 MPa. Preferably, the MOR is at least about 10 MPa, more preferably the MOR is at least about 15 MPa, even more preferably at least about 20 MPa and most preferably at least about 35 MPa. The MOR is determined by 4 point bending of a bar cut from a ceramic honeycomb. The strength measurement may be made using a known technique such as described by ASTM C1161.

In addition, the ceramic composition desirably has a permeability coefficient that is as high as possible to reduce back pressure buildup, while still retaining sufficient particles. The permeability coefficient is proportional, for example, to the total amount of porosity and size of the pores and inversely proportional to tortuosity of the interconnected porosity. Generally, the permeability coefficient should be at least $1 \times 10^{-13}$ m$^2$ as determined using Darcy's equation. Preferably, the permeability coefficient is at least about $2 \times 10^{-13}$ m$^2$.

Surprisingly, the porous ceramic composition and in particular an acicular mullite porous ceramic composition has improved retention of strength (modulus of rupture) and thermal shock factor compared to a mullite composition failing to have one of Eu, Gd, Nd or mixture thereof in combination with the absence of the above described metals. Generally, the thermal shock factor is at least about 200° C. after being exposed to humid air and alumina or ash at elevated temperatures as described above. The thermal shock factor (TSF) is given by the following equation:

$$TSF = \frac{Strength}{(Modulus)(CTE)}$$

where CTE is the coefficient of thermal expansion given in (1/° C.). Mullite's CTE is about $5.3 \times 10^{-6}$ per ° C. over the range of room temperature to 800° C.

Even though the theoretical Al/Si mullite stoichiometry is 3 ($3Al_2O_3 \cdot 2SiO_2$), the bulk Al/Si stoichiometry of the mullite composition may be any suitable stoichiometry, such as 4.5Al/Si to 2Al/Si. Bulk stoichiometry means the ratio of Al to Si in the body (i.e., not each individual grain). It has surprisingly been discovered, however, that further improvements to retained strength occur when the bulk stoichiometry of the body is greater than 3.01 to 4.5, which correlates to an alumina ($Al_2O_3$) to silica ($SiO_2$) stoichiometry of greater than 1.75.

The bulk stoichiometry may be measured by any suitable techniques, such as those known in the art, including, for example, X-ray fluorescence.

Forming the Ceramic Composition

In making the ceramic composition, precursor compounds for the particular ceramic composition are mixed to form a mixture. Illustratively, when making mullite and in particular acicular mullite, precursor materials containing aluminum, silicon, oxygen and one or more rare earth that is Eu, Gd, Nd are mixed to form a mixture. Precursor compounds that may be used, realize the porous ceramic composition of the invention, are described, for example, in U.S. Pat. Nos. 5,194,154; 5,198,007; 5,173,349; 4,911,902; 5,252,272; 4,948,766 and 4,910,172, each incorporated herein by reference. It is understood that it is desirable to select pure materials as described above.

Generally, the mixture may be comprised of synthetic or high purity clay (i.e., hydrated aluminum silicate), alumina, silica, aluminum trifluoride, fluorotopaz. Preferably, the precursor compounds are silica (amorphous or crystalline such as quartz) and alumina and mixtures thereof.

Generally, the mixture contains a total amount of alkali metals, alkaline earth metals and other transition metals not including yttrium in an amount such that the grain boundary phase will have less than the aforementioned 2% by weight in the grain boundary phase. Generally this means the total amount of these metals in the mixture should be at most about 0.5%, 0.25%, 0.1%, 0.01% or essentially 0% of the mixture (i.e., below the detection limit of analytical techniques useful for measuring bulk elemental chemistry such as those known in the art, including for example, X-ray fluorescence and inductively coupled plasma atomic emission spectroscopy.

The mixture may also contain organic compounds to facilitate the shaping of the mixture (e.g., binders and dispersants, such as those described in *Introduction to the Principles of Ceramic Processing*, J. Reed, Wiley Interscience, 1988). It is understood that compounds such as organic additives or porogens (e.g., graphite) are not included in determining the amount of the undesirable metals described in the previous paragraph. In other words, such compounds do not contribute to such metals in the final composition. If however, these compounds do result in such residual metals upon removal, these are taken into account.

Any compound containing Eu, Gd, Nd may be used so long as it forms the oxide grain boundary phase of the porous ceramic composition. The compound may be an oxide or one that forms an oxide when the mixture is heated to form the ceramic composition such as described below in this paragraph. Exemplary compounds include an oxide, an inorganic metal salt (e.g., chloride, fluoride, nitrate, chlorate, carbonate) or an organic metal compound such as an acetate. Preferably the compound is an oxide, nitrate, acetate, carbonate or combination thereof. Most preferably the compound is an oxide.

The precursor compounds may be selected in proportions so that the resultant mullite has an Al/Si stoichiometry from about 2 to about 4.5, as described previously. Preferably, the precursors are selected so that the mullite body has an Al/Si bulk stoichiometry of at least about 2.5 to 4.25. It is understood herein that the Al/Si stoichiometry refers to the aluminum and silicon in the precursor ceramic. That is to say, if the fluorine source, for example, is $AlF_3$, the amount of $SiO_2$ present in the precursors for stoichiometry purposes may be reduced by an amount of $SiF_4$ that is volatalized off by the reaction of the fluorine from the $AlF_3$ with the $SiO_2$ to form $SiF_4$.

The amount of the Eu, Gd, Nd compound is added to the inorganic mixture in an amount generally from about 0.1% percent to about 10 percent by weight of the mixture or in the alternative in an amount sufficient to provide the amount in the grain boundary phase for the porous ceramic composition previously described. Preferably the amount of the compound is at least about 0.1, more preferably at least about 0.5, and most preferably at least about 1.0 to preferably at most about 10, more preferably at most about 4, and most preferably at about 2.0 percent by weight of the mixture. If a rare earth compound is desired, the total amount of the rare earth and yttrium compound is the same as just described with the caveat that the amount of the Eu, Gd, or Nd compound yields a total amount of rare earth as described above.

The mixture may be made by any suitable method such as those known in the art. Examples include ball milling ribbon blending, vertical screw mixing, V-blending, jet milling, and attrition milling. The mixture may be prepared dry (i.e., in the absence of a liquid medium) or wet using any suitable liquid such as water or alcohol.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

The shaped porous body is then heated under a suitable atmosphere to form the desired porous ceramic composition. Generally such sintering temperatures range from 1000° C. to 2400° C.

In a particular embodiment after heating to form the body it has been surprisingly found that fillets of uniform chemical composition (preclude phase separation) may be produced by rapidly cooling the body through the glass transition temperature of the glass grain boundary phase that forms during heating. This temperature for oxide glasses of pertinence herein generally is within the temperature range of 600° C. to 1600° C. and typically is between 800 to 1500° C. The body is cooled through the glass transition temperature at such a rate to preclude phase separation of the amorphous grain boundary phase glass. This generally coincides with the cooling rate being at least 6° C./min. Desirably, the cooling rate is at least 7° C./min, 8° C./min, 9° C./min, 10° C./min or even 15° C./min to a rate that does not crack the part (e.g., 100° C./min).

As an illustration, acicular mullite may be formed by heating under an atmosphere containing fluorine to a temperature sufficient to form said mullite composition. Fluorine may be provided in the gaseous atmosphere from sources such as $SiF_4$, $AlF_3$, HF, $Na_2SiF_6$, NaF, $NH_4F$, and fluorocarbons such as polytetrafluoroethylene. Preferably, the source of fluorine is from $SiF_4$. Preferably the fluorine is separately provided. "Separately provided" means that the fluorine containing gas is supplied not from the compounds in the mixture (e.g., $AlF_3$), but from an external gas source pumped into the furnace heating the mixture. This gas preferably is a gas containing $SiF_4$.

Generally in the illustrative method, the acicular mullite porous composition is heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably, the first temperature is at least about 550° C., more preferably at least about 650° C. and most preferably at least about 700° C. to preferably at most about 900° C., more preferably at most about 700° C. and most preferably at most about 900° C.

The second temperature may be any temperature suitable depending on variables such as the partial pressure of $SiF_4$. Generally, the second temperature is at least about 960° C. to at most about 1700° C. Preferably, the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature, the atmosphere is inert (e.g., nitrogen) or a vacuum until at least about 500° C., which is when a separately provided fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988. This separate heating step is commonly referred to as binder burnout.

After cooling and forming the illustrative porous acicular mullite composition, said mullite composition may be further heat treated to complete the formation of acicular mullite, remove residual fluorine, and establish the final grain boundary phase and composition. This heat treatment may be carried out in air, water vapor, oxygen, an inert gas or mixture thereof for a time sufficient to form the mullite composition. Examples of inert gases include nitrogen and the noble gases (i.e., He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor. When using this further heat treatment, the aforementioned cooling rate may be applied here to realize the uniformity of fillets chemical composition.

The time at the heat treatment temperature is a function of the heat treatment atmosphere, particular illustrative mullite composition and temperature selected. For example, a heat treatment in wet air (air saturated with water vapor at about 40° C.) generally requires more than several hours to 48 hours at 1000° C. In contrast, ambient air, dry air or nitrogen (air having a relative humidity from about 20 percent to 80 percent at room temperature) desirably is heated to 1400° C. for at least about 2 hours.

Generally, the time at the heat treatment temperature is at least about 0.5 hour and is dependent on the temperature used (i.e., generally, the higher the temperature, the shorter the time may be). Preferably, the time at the heat treatment temperature is at least about 1 hour, more preferably at least about 2 hours, even more preferably at least about 4 hours and most preferably at least about 8 hours to preferably at most about 4 days, more preferably at most about 3 days, even more preferably at most about 2.5 days and most preferably at most about 2 days.

The porous ceramic composition and in particular the illustrative acicular mullite composition may be particularly useful as a support for a catalyst, such as precious metal catalyst on alumina containing wash coat particles, typically referred to as a catalyst wash coat, used in automotive catalytic converters or particulate traps. It is also preferred that the wash coat makes a thin coating on at least a portion of the ceramic grains and invariably contact the grain boundary phase of the composition. A portion is generally when at least about 5 percent of the area of the grains of one region are covered by the catalyst coating. Preferably, substantially all of the grains of one region are coated. More preferably, substantially all of the grains of the composition are coated.

Thin coating means that the catalyst wash coating has a thickness generally less than the average smallest dimension of the grains coated. Generally, the thickness of the coating is at most about half the thickness, preferably at most about one third and most preferably at most about one quarter the thickness of the average smallest dimension of the grains coated.

The composition may also be particularly useful as a particulate (soot) trap and oxidation (i.e., exhaust) catalyst for mobile power applications (e.g., diesel engines) and stationary power applications (e.g., power plants). The composition, when used as a diesel particulate trap, may have at least a portion of the mullite grains coated with a catalyst, as described above. Of course, the composition may be useful as soot trap itself without any catalyst.

EXAMPLES

Example 1

153.1 grams of CKA10 kappa alumina (available from Ceramiques Technique et Industrielles (CTI), Salindres, France); 44.92 grams of Min-u-sil 5 silica (available from U.S. Silica Company, Berkley Springs, West Virgina, U.S.A.); 1.982 gm of Europium oxide (99.99% Strem Chemicals U.S.A.); 7.0 grams of A4M METHOCEL™ cellulose ether (available from The Dow Chemical Company, Midland, Mich.); and 22.0 grams of A625 graphite powder (Cummings-Moore Corporation, Detroit, Mich., U.S.A) was mixed in a small high speed grinder/mixer for 1 minute to blend all the dry components uniformly to form a dry mixture. The metal impurities of the alumina, silica and Europium oxide are shown in Table 1. The mixture had an amount of other metals (i.e., alkali, alkaline earth, and transition metals described above) of less than about 0.2% by weight of the mixture.

42 grams of water was added to the dry mixture in small increments with mixing until the mixture was a homogeneous paste. This paste was then placed in an extruder and a ribbon of paste was extruded using a ribbon (rectangular) die with a 1.5 mm×1.5 cm opening. The ribbon was cut to ~7 cm long small bars and allowed to air dry over night in air and then placed in an oven at a temperature of 100° C. for several hours to completely remove all the water from the bars.

The dried bars were then placed in a kiln and fired to 1065° C. (calcination temperature) in air and held for 2 hrs at that temperature to remove all the organic materials and form a slightly sintered (calcined) ceramic comprised of the alumina, silica and Europium oxide. The slightly sintered ceramic had an Al:Si mole ratio of 4:1 and a Europium content of 1 wt %.

The calcined bars were then placed in a controlled atmosphere sealed autoclave. The atmosphere in the autoclave was pumped out and refilled with inert gas ($N_2$) 3 times and then finally pumped out to a vacuum of less than 1 torr. The autoclave was heated to 700° C. set point and $SiF_4$ gas was introduced to the autoclave at a rate such that the exothermic reaction in the conversion of alumina and silica to the crystalline form of fluorotopaz was kept at less than 750° C. Excess $SiF_4$ gas was added to the autoclave as the temperature was stabilized at the set point of 700° C. and the autoclave was held for 16 hrs at these conditions.

The autoclave was then heated to 1250° C. and the pressure was maintained at 150 torr during the heat up by means of a controlled pump out of $SiF_4$ gas and a pressure controller for that set point. The fluourotopaz was then converted to acicular mullite (ACM) at ~1050-1060° C. with release of $SiF_4$ during the transition. The autoclave was then purged again to an inert atmosphere and slowly cooled to room temperature.

The bars were removed from the autoclave and placed in kiln and heated slowly to 1490 C and held for 6 hrs. Then the kiln was cooled at a cooling rate of 2.5° C./min between 1490° C. to 700° C., which was through the glass transition temperature of about 850° C. These final bars were removed and the strength determined as described below. The bars had a crystalline grain boundary phase, wherein the grain boundary had an amount crystalline grain boundary phase of more than 50% by volume of the grain boundary phase.

10 final bars were used to determine the initial strength (i.e., not subject to any further treatments "untreated bars"). 10 bars were wash coated with colloidal gamma alumina (AL20SD Nyacol Nano Technologies Inc., Ashland, Mass., U.S.A.) and placed in a furnace and dried at 500° C. These bars were then placed in an autoclave furnace and heated to 860° C. in the presence of 10% by volume water which was pumped in to the furnace continuously to maintain the moisture in the atmosphere of the furnace. These conditions were held for 100 hrs and then the furnace was cooled and these "treated" bars removed.

The untreated bars and the treated bars were then subjected to a 4 point bend test according to ASTM method C1161. The average of MOR for the 10 untreated and treated bars is shown in Table 2 as well as the % change in strength of the treated bars compared to the untreated bars. The grain boundary of the bars of this Example had an amount of other metals other than Al, Si, and Eu that was essentially not detectable by EDS.

Examples 2,3 and Comparative Examples in Table 3

Bars were made and tested in the same way as in Example 1, except that the amounts used to form the dry mixture and water used to make the paste are shown in Tables 2 and 3. In addition the particular temperatures and pressures used to make the mullite are also shown in Tables 2 and 3 as well as the strength of the treated and untreated bars. The bars of these Examples also had a crystalline grain boundary phase as described for Example 1. Each of these Examples had an amount of other metals (beside the added RE metal) in the grain boundary phase in the amount below the EDS detection limit as described in Example 1.

The Examples and Comparative Examples show that the bars made with Eu, Gd and Nd have superior retained strength after being exposed to humid conditions in contact with high surface area alumina.

TABLE 1

Silica, Rare Earth oxides, Alumina Chemistry

| Additive | Total Metal Impurites (% by weight)* | Total Rare earth metal elements (% by weight) |
|---|---|---|
| Silica (Minusil 5) | 0.07% | 0 |
| Kappa alumina | 0.30% | 0 |
| Yttria | None detected | 0.0015 |
| Europium oxide | None detected | 99.99 |
| Gadolinium oxide | None detected | 99.99 |
| Neodymium oxide | None detected | 99.99 |
| Cerium oxide | None detected | 99.99 |

*Does not include metallic elements present in mullite & rare earth metals.

TABLE 2

| Ex | $SiO_2$ (g) | $Al_2O_3$ (g) | RE | REO (g) | RE (wt %) | C# (g) | Methocel (g) | Al/Si Ratio | Mullite Forming $SiF_4$ P (torr) | Porosity % | Untreated bar strength (MPa) | Change in bar MOR after treatment (%) | TSF untreated bars (° C.) | TSF Treated bars (° C.) |
|---|---|---|---|---|---|---|---|---|---|---|---|---|---|---|
| 1 | 44.9 | 153.1 | Eu | 1.98 | 1 | 22 | 7 | 4 | 150 | 62 | 19.8 | −6% | 204 | 184 |
| 2 | 44.9 | 153.1 | Gd | 1.98 | 1 | 22 | 7 | 4 | 150 | 60 | 18.5 | −7% | 200 | 180 |
| 3 | 44.9 | 153.1 | Nd | 1.98 | 1 | 22 | 7 | 4 | 150 | 61 | 22.1 | −16% | 234 | 193 |

RE = Rare earth
REO = Rare earth oxide

TABLE 3

| Ex | SiO$_2$ (g) | Al$_2$O$_3$ (g) | RE | REO (g) | RE (wt %) | C$^\#$ (g) | Methocel (g) | Al/Si Ratio | Mullite Forming SiF$_4$ P (Torr) | Porosity % | Untreated bar strength (MPa) | Change in bar MOR after treatment (%) | TSF untreated bars (° C.) | TSF Treated bars (° C.) |
|---|---|---|---|---|---|---|---|---|---|---|---|---|---|---|
| 1 | 44.9 | 153.1 | Ce | 1.98 | 1 | 22 | 7 | 4 | 150 | 61 | 20.1 | −31% | 221 | 155 |
| 2 | 44.9 | 153.1 | La | 1.98 | 1 | 22 | 7 | 4 | 150 | 62 | 22.4 | −20% | 251 | 198 |

$^\#$Graphite
*Met = metal impurities

The invention claimed is:

1. A porous ceramic composition comprising ceramic grains bonded together by a grain boundary phase comprised of silica, one or more rare earth elements that is Eu, Gd, Nd or any mixture thereof, and oxygen, and optionally yttrium, wherein the grain boundary phase has an amount of an alkali, an alkaline earth metal and a transition metal other than yttrium that is at most 2% by weight of the grain boundary phase; and
wherein a concentration of any Fe in the grain boundary phase is less than 0.1 weight percent and a concentration of any Mg in the grain boundary phase is less than 0.1 weight percent.

2. The composition of claim 1, wherein the ceramic grains are mullite, SiC, or silicon nitride grains.

3. The composition of claim 1, wherein the one or more rare earth elements is Eu, Gd, or a mixture thereof.

4. The composition of claim 1, wherein the grain boundary phase is amorphous and has a uniform chemical composition; and wherein the ceramic grains are formed from mixtures of i) amorphous or crystalline silica and ii) alumina.

5. The composition of claim 3, wherein the grain boundary phase is comprised of yttrium in an amount by weight less than the amount of the one or more rare earth elements present in the grain boundary phase.

6. The composition of claim 1, wherein the grain boundary phase is also comprised of a group 13 element.

7. The composition of claim 1, wherein the amount of alkali, alkaline earth metals and transition metals other than yttrium is at most 1% by weight of the grain boundary phase.

8. The composition of claim 1, wherein the composition of claim 1 retains at least 80% of its strength after being heated to 860° C. and held for 100 hours under humid air while at least a portion of the grain boundary phase is in contact with gamma alumina particulates.

9. The composition of claim 1, wherein the rare earth element is present in the grain boundary phase in an amount of 10% to 60% by weight of the grain boundary phase.

10. A particulate filter comprised of the composition of claim 1.

11. A method for preparing a porous ceramic composition, the method comprising, a) forming a mixture of one or more precursor compounds having one or more rare earth elements that is Eu, Gd, Nd or any mixture thereof and elements present in the ceramic composition, b) shaping the mixture into a porous green shape, c) heating the porous green shape of step (b) to a temperature such that ceramic grains arising from the one or more precursor compounds are bonded together by a ceramic grain boundary phase containing the rare earth element and oxygen to form the porous ceramic composition;
wherein a concentration of any Fe in the ceramic grain boundary phase is less than 0.1 weight percent and a concentration of any Mg in the ceramic grain boundary phase is less than 0.1 weight percent.

12. The method of claim 11, wherein the mixture has an amount of alkali metals, alkaline earth metals and transition metals other than yttrium and not including the rare earth element(s) that is at most 0.5% by weight of the total amount by weight of the precursor mixture.

13. The method of claim 11, wherein the ceramic grains are mullite that are acicular.

14. The method of claim 11 wherein the precursor compound having the rare earth element is an oxide, acetate, carbonate or nitrate.

15. The method of claim 11, wherein the mixture is further comprised of a precursor compound comprised of yttrium.

16. The method of claim 11 wherein the one or more rare earth elements is Eu, Gd, or a mixture thereof.

17. The method of claim 13 wherein the precursor compounds have a molar ratio of Al/Si that is greater than 3 to 4.2, and the total amount of alkali metal, alkaline earth metal and transition metal other than yttrium in the mixture is less than 0.01 weight percent.

18. The method of claim 11, wherein the ceramic grain boundary phase is amorphous; and wherein the ceramic grains are formed from mixtures of i) amorphous or crystalline silica and ii) alumina.

19. The method of claim 18 further comprising cooling the bonded together ceramic grains at a cooling rate through the glass transition temperature of the ceramic grain boundary phase at a cooling rate of at least 6° C./min to preclude phase separation of the amorphous ceramic grain boundary phase.

20. A method for preparing a porous ceramic composition, the method comprising, a) forming a mixture of one or more precursor compounds having one or more rare earth elements that is Eu, Gd, Nd or any mixture thereof and elements present in the ceramic composition, b) shaping the mixture into a porous green shape, c) heating the porous green shape of step (b) to a temperature such that ceramic grains arising from the ceramic particulates are bonded together by a ceramic grain boundary phase containing the rare earth element and oxygen to form the porous ceramic composition;
wherein the precursor compounds include i) amorphous or crystalline silica and ii) alumina; and the ceramic grains are formed essentially from the amorphous or crystalline silica and the alumina.

\* \* \* \* \*